April 3, 1956          J. W. DYER          2,740,958
MAGNET MOTOR FOR VIBRATING DIAPHRAGM SOUND SIGNALS
Filed May 6, 1953          2 Sheets-Sheet 1
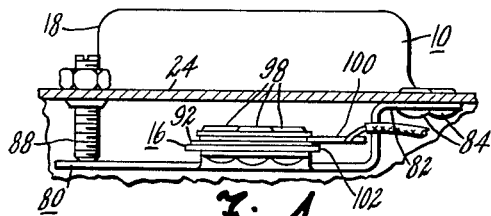
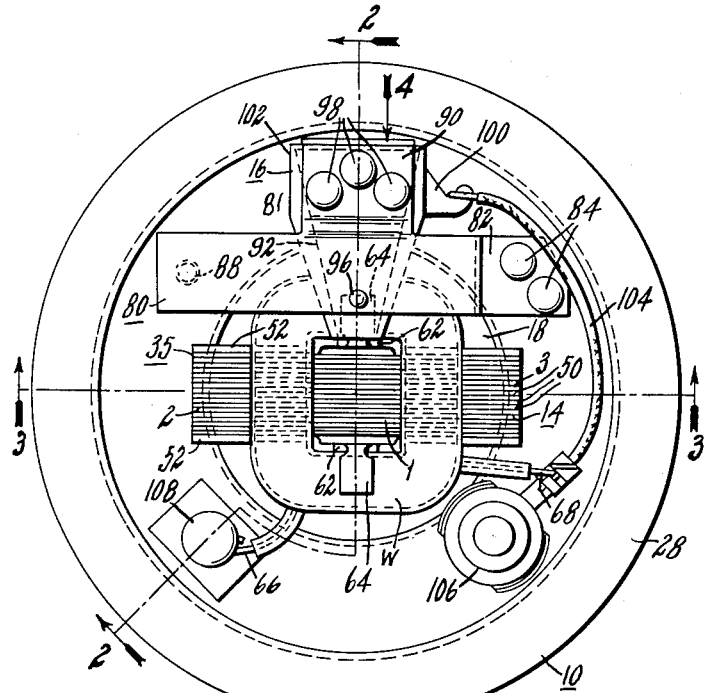
INVENTOR.
JOHN W. DYER
BY
HIS ATTORNEY April 3, 1956        J. W. DYER        2,740,958

MAGNET MOTOR FOR VIBRATING DIAPHRAGM SOUND SIGNALS

Filed May 6, 1953        2 Sheets-Sheet 2

INVENTOR.
JOHN W. DYER

BY

*John P. Marin*

HIS ATTORNEY

United States Patent Office 2,740,958
Patented Apr. 3, 1956

2,740,958

MAGNET MOTOR FOR VIBRATING DIAPHRAGM SOUND SIGNALS

John W. Dyer, Pendleton, Ind., assignor to General Motors Corporation, Detroit, Mich., a corporation of Delaware Application May 6, 1953, Serial No. 353,357

5 Claims. (Cl. 340—388)

This invention relates to the improvement of magnet motors for vibrating mechanisms such as automobile horns or other sound signals.

The main object of the invention is to increase the useful flux paths coupling an armature with a field frame and by diminishing the leakage of flux to a minimum.

A field frame of rather open formation is provided in which a bridging portion supports widely spaced leg portions, between which is disposed an energizing winding having a relatively large central opening within which is movable the stem portion of an armature somewhat of T-formation in section. By that means the arms of the T overlap the ends of the field frame and the end of the stem approaches the web portion of the field frame, which provides a maximum of conductive material in the path of the useful flux effected by energizing of the winding.

Further objects and advantages of the present invention will be apparent from the following description reference being had to the accompanying drawings wherein a preferred embodiment of the present invention is clearly shown.

In the drawing:

Fig. 1 is a plan view of a magnet field frame assembly substantially as indicated by the line and arrows 1—1 of Fig. 2.

Fig. 2 is a transverse sectional view through the construction somewhat as indicated by the line and arrows 2—2 of Fig. 1.

Fig. 3 is a sectional view through the motor construction somewhat as indicated by the line and arrows 3—3 of Fig. 1.

Fig. 4 is an elevational view of a circuit breaker mechanism somewhat as indicated by the arrow 4 in Fig. 1.

Figure 5:
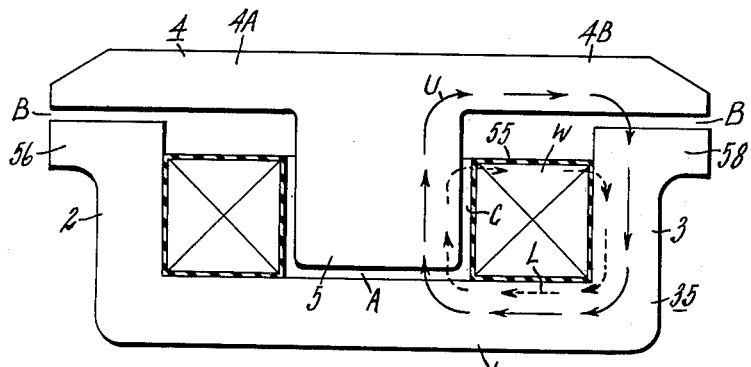
Fig. 5 is a diagrammatic view for illustrating the principle of the improvement.

Referring particularly to the drawing and first, with respect to Fig. 5, the magnet motor comprises a field frame including a web portion 1 joined to parallel leg portions 2 and 3 which cooperate with an armature 4 overlapping the ends of legs 2 and 3 to provide air gaps B. The armature has a central stem 5 extending in close proximity to the bottom of the web portion 1 providing an air gap A. Disposed between the legs 2 and 3 and secured to the web 1 is an energizing winding W having a hollow core surrounding the stem 5 in spaced relation thereto for providing an air gap C. When the winding W is energized this construction provides a useful flux path following the solid line arrows marked U, and also forms a leakage flux path following the dotted line arrows designated L. It is apparent that the useful flux path embraces one end of the frame 1, the air gap A, stem 5, armature 4, the air gap B, and the leg 3 and back to the end of web 1, by which there is a magnetic effect across both air gaps A and B. The leakage flux path L also embraces the leg 3, one end of the web 1 of the frame, the air gap A, the stem portion 5 and the air gap C, and thence across the winding to the leg 3 of the frame. The flux across the air gap C produces no useful component in moving the armature toward the field frame.

In prior art devices, the stem portion 5 of the armature was included as a portion of the field frame and was severed from the armature portion so that the axial air gap A appeared at the juncture of the armature 4 and stem 5, by reason of which the leakage flux L had a continuous conductive path on three sides of the winding W but had no air gap providing a useful component of flux.

Figure 6:
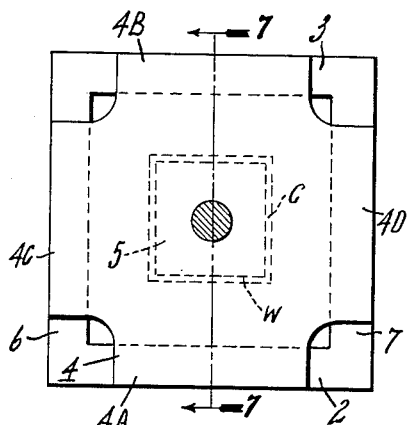
Figs. 6 and 7 are views of a modified form of a magnet motor embodying the invention.
Figure 7:
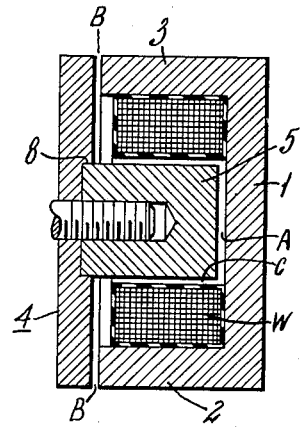

In the preferred construction, adopting the principles of Fig. 5, the armature and field frame are each constructed of laminations of the configurations disclosed, but it would be apparent that the same principle of operation may be applied to field frames and armatures of solid construction, somewhat as indicated in Figs. 6 and 7, being a modification of the motor construction illustrated and claimed in application Ser. No. 269,966. Equivalent parts are indicated by the same reference characters with reference to the solid plate construction illustrated in Figs. 6 and 7, where the armature 4 is substantially rectangular and has opposite extending portions 4A and 4B extending over the ends of legs 2 and 3, and portions 4C and 4D extending over the ends of legs 6 and 7 of the field frame. Secured centrally of the armature there is the stem 5 disposed in the recess 8 on the under side of the armature 4 somewhat as shown in Fig. 7. Here the legs 4A—4B—4C—4D extend to one side from the square web portion 1, forming a square cup-like structure within which the coil W is contained. Thus, as shown in Fig. 7, the features described with respect to Fig. 5 are also contained, and which apply equally well to a section taken at right angles thereto.

The above features are incorporated in the physical embodiment illustrated in Figs. 1 to 4 inclusive, where 10 designates a back shell of a vibratory horn or sound signal and cooperates with a diaphragm 12 to house the magnet motor 14 and a circuit breaker mechanism 16. The back shell 10 provides a central cylindrical chamber 18 having a plain bottom wall 20 surrounded by a cylindrical wall 22, in turn joining a flat annular portion 24 which has a rim 26 of cylindrical form and ends in an annular flange 28, forming a seat for the periphery portion 30 of the diaphragm 12 which is clamped in place by the rim 32 of a trumpet supporting plate 34.

The magnet motor 14 comprises a field frame 35 securely mounted in the chamber 18 of the back shell, which cooperates with the armature 4 secured to diaphragm 12 by a screw 36 passing through washers 38, 40, 42, 44 and threading into the armature as indicated at 46.

The field frame 35 is made up of a plurality of laminations 50 of magnet material held together between end plates 52 of heavy material, and of the same general configuration. Rivets 54 are preferably used to secure the parts together. Hence, the contour of the laminations of the web portion 1 joined at their ends to the parallel legs 2 and 3, form pole faces 56 and 58 when the laminations are clamped together. These end portions have extensions 60 adapted to engage the rim 24 of the back shell when the magnet frame is seated or positioned within chamber 18.

From the middle of the plates 52 there are tangs 62 extending substantially parallel with the legs 2 and 3 and which terminate in bendable tongues 64 as shown in Figs. 1 and 2. The energizable winding W includes leads 66 and 68 and is in the form of a square ring enclosed in insulating material, such as a sheath 55. This winding assembly is dipsosed between the legs 2 and 3 and forced against the web 1 of the field frame so that the square opening of the coil form embraces the tangs 62 as shown in Figs. 1 and 2. When so positioned the tongues 64 are bent outwardly and down against the top of the coil as particularly shown in Fig. 2. The field frame and coil so assembled are then positioned in the chamber 18 of the back shell where they are welded in place. Jigs may be used to properly position the parts which may be welded at suitable points, for example at the bottom edge of the plates 52 adjacent the back shell.

The armature is composed of a plurality of T-shaped laminations which provide the stem 5 and lateral extensions 4A and 4B held together by rivets 72 upset against end plates 74 of the same general T-shaped formation. At least one of the end plates 74 has an integrally formed tang 76 bent outwardly to actuate the circuit breaker 16 when the winding W is energized. The armature so formed is secured to diaphragm 12 by the screw 36 threaded into a bore 78 as shown at 46.

The circuit breaker mechanism comprises a strap 80 having an off-set portion 82 mounted on the portion 24 of the back shell by rivets 84, the other end of the strap 80 extending across the back shell where a free end is flexed to engage the end of an adjusting screw 88 threaded through the portion 24 of the back shell. At the middle portion of the strap 80 an offset ledge 90 supports the circuit breaker mechanism 16 of conventional type including a spring leaf 92 having a contact 94 yieldably engaging a fixed contact 96 mounted on the strap 80. The leaf spring 92 is insulatingly supported from the offset 90 by rivets 98 and electrically connected with the connector 100. A nonconducting strip 102 is inserted between the spring leaf 92 and the tongue 76 of the armature assembly. From the connector lug 100 a wire 104 makes connection with the coil lead 68 and joints a resistance element 106 mounted on the back shell, the opposite end of the winding W having its lead 66 connecting with the binding post 108 insulatingly mounted on the portion 24 of the back shell.

While the embodiment of the present invention constitutes a preferred form, it is to be understood that other forms might be adopted.

What is claimed is as follows:

1. In a sound signal having a cup-shaped outer housing having a bottom and rim portion, a diaphragm secured to the rim of said housing for forming an enclosed chamber, and an electromagnetic motor means for moving said diaphragm with a vibratory action relative to said housing, said means comprising: a field frame including a stack of U-shaped laminations clamped between a pair of end plates, said stack being rigidly secured to the bottom of said housing bendable lugs on said end plates, an energizing winding disposed between the legs of said U-shaped frame having a central opening and held assembled to said frame by said lugs, and an armature attached to said diaphragm having a T-shaped cross-section wherein the stem portion extends through the opening in said winding and is in close proximity to the bottom portion of said U-shaped frame.

2. The combination set forth in claim 1 wherein the armature comprises a stack of T-shaped laminations clamped between a pair of T-shaped face plates, and wherein said face plates have a laterally bent lug adapted to operate a circuit breaker upon motion of the armature.

3. The combination set forth in claim 1 wherein the field frame comprises a stack of U-shaped laminations extending on opposite sides of the energizing winding, said armature comprising a group of T-shaped laminations forming a stem portion extending through the axis of the winding and lateral arms extending over the ends of the U-shaped laminations, said armature and field frame when assembled providing an axial air gap for the flux path between the end of the stem and bottom of the field frame, and also providing lateral gaps at the end of the armature and the legs of the field frame.

4. In a sound signal having a cup-shaped outer housing providing a rim and bottom, a diaphragm adapted to be secured to said rim for forming an enclosed chamber therewith, an electromagnetic motor means enclosed within said chamber for vibrating said diaphragm relative to said housing, said means comprising: a field frame having a pair of parallel pole pieces joined at one end by a bridging portion to provide a frame having a U-shaped cross-sectional shape that is secured to the bottom of said housing, a pair of bendable lugs carried by said frame, an energizing winding seated against said bridging portion and disposed between said parallel arms and having a large central opening and held in position on said frame where said lugs are bent over said windings, and an armature assembly secured to said diaphragm and having a central stem-like portion extending through the opening in said winding and spaced at its end from the bridging portion to provide an axial air gap, said armature having oppositely extending portions at one end of said stem overlapping the ends of said parallel pole pieces and simulating in section a T-shaped assembly, said armature extensions and pole pieces forming air gaps laterally disposed of said axial air gap, said axial and lateral gaps being included in the useful flux path of said energizable winding, and said axial air gap providing a useful component in the leakage flux paths between said armature and field frame.

5. In a sound signal having a cup-shaped outer housing providing a rim and bottom, a diaphragm adapted to be secured to said rim for forming an enclosed chamber therewith, an electromagnetic motor means enclosed within said chamber for vibrating said diaphragm relative to said housing, said means comprising: a field frame having a pair of parallel pole pieces joined at one end by a bridging portion to provide a frame having a U-shaped cross-sectional shape that is secured to the bottom of said housing, a pair of bendable lugs integrally formed on said frame, an energizing winding seated against said bridging portion and disposed between said parallel arms and having a large central opening and held in assembled position on said frame by said lugs when said lugs are bent over said winding, and an armature assembly being attached to said diaphragm and comprising: a central stem-like portion extending through the opening in said energizing winding and having lateral portions extending over the ends of the poles of the field assembly, whereby an axial gap is formed between the bridge member and the end of said stem, a lateral gap is formed between the ends of said armature and parallel poles, and a perimetric gap is formed between the outside of said stem and the inner diameter of said winding whereby all flux paths through said magnet motor have a useful component.

References Cited in the file of this patent

UNITED STATES PATENTS

| | | |
|---|---|---|
| 2,135,328 | Critchfield | Nov. 1, 1938 |
| 2,360,744 | Van Valkenburg et al. | Oct. 17, 1944 |
| 2,467,489 | McClain | Apr. 19, 1949 |
| 2,560,323 | Aufiero | July 10, 1951 |
| 2,575,095 | Charbonneau et al. | Nov. 13, 1951 |